US007027972B1

(12) United States Patent
Lee

(10) Patent No.: US 7,027,972 B1
(45) Date of Patent: Apr. 11, 2006

(54) SYSTEM FOR COLLECTING AND ANALYZING GRAPHICS DATA AND METHOD THEREOF

(75) Inventor: Corinna Lee, Toronto (CA)

(73) Assignee: ATI Technologies, Inc., Toronto (CA)

( * ) Notice: Subject to any disclaimer, the term of this patent is extended or adjusted under 35 U.S.C. 154(b) by 927 days.

(21) Appl. No.: 09/768,530

(22) Filed: Jan. 24, 2001

(51) Int. Cl.
G06F 3/00 (2006.01)
G06F 9/44 (2006.01)
G06F 9/46 (2006.01)
G06F 13/00 (2006.01)
G06F 9/45 (2006.01)

(52) U.S. Cl. .................... 703/22; 719/323
(58) Field of Classification Search ............ 703/22; 719/323
See application file for complete search history.

(56) References Cited

U.S. PATENT DOCUMENTS

| | | | |
|---|---|---|---|
| 5,687,376 A * | 11/1997 | Celi et al. .................... 717/127 |
| 5,883,640 A * | 3/1999 | Hsieh et al. ................. 345/503 |
| 5,920,326 A * | 7/1999 | Rentschler et al. .......... 345/503 |
| 6,009,476 A * | 12/1999 | Flory et al. .................. 719/324 |
| 6,115,054 A * | 9/2000 | Giles ........................... 345/522 |
| 6,337,689 B1 * | 1/2002 | Hochmuth et al. ........... 345/522 |
| 6,631,423 B1 * | 10/2003 | Brown et al. ................ 719/323 |

OTHER PUBLICATIONS

Mason Woo, Jackie Neider, Tom Davis, "Open GL Programming Guide" Second Edition, Addison-Wesley, ISBN 0-201-46138-2 Aug. 1998, pp. 251-276.*

* cited by examiner

Primary Examiner—Paul L. Rodriguez
Assistant Examiner—Dwin Craig
(74) Attorney, Agent, or Firm—Toler, Larson & Abel, LLP

(57) ABSTRACT

A system and methods are shown for performing a hardware performance analysis of graphics hardware and an application program. An application program generates a set of function calls. The function calls are translated to a native command set. The native command set is stored within a database. Software simulations and hardware emulations are used to compare the stored native command set data to a hardware architectural description of the graphics hardware. Data collected from the simulations are used to provide a performance model from which the performance of a graphics hardware executing commands for the application program can be determined.

73 Claims, 6 Drawing Sheets

SYSTEM FOR COLLECTING AND ANALYZING GRAPHICS DATA AND METHOD THEREOF

FIELD OF THE INVENTION

The present invention relates generally to computer graphics hardware and more particularly to collecting data to be processed by computer graphics hardware.

BACKGROUND OF THE INVENTION

Graphics devices, such as graphics chips and graphics cards, are used to assist computers in handling particularly intensive video information, such as 3D (3-dimemsional) video graphics rendering and the like. Graphics cards are designed to accelerate the computationally intensive processes, allowing the computer to display complex video at a pleasing frame rate. A graphics card's performance can be reflected in how well it handles video requests from a computer application, such as in terms of frames in a sequence of video displayed per second, known as the frame rate. The computer graphics industry consistently produces new graphics cards to handle the requests from the computer applications. Software developers create new applications capable of pushing existing computers with graphics cards to their limits. It is not generally known how a designed graphics card will handle requests generated by a new application.

Assumptions are made as to the type of operations that should be processed more efficiently. Graphics cards can then be designed based on those assumptions. However, the actual performance of the graphics card design in handling requests for an application is unknown. The performance of the designed graphics card is determined by having the graphics card execute the requests from the application. Testing graphics card designs require that the graphics card be built. If the graphics card is inadequate, a new card must be designed, built, and tested. Due to this process, substantial time and resources are taken in testing new graphics card designs.

Therefore, a method and/or system for determining the performance of a graphics device prior to the graphics device being manufactured would be useful.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE DRAWINGS

At least one embodiment of the present invention provides a method for collecting commands generated by a graphics application. The method includes receiving a graphics function call from a driver. The method also includes converting the graphics function calls to a native command set for execution on a native system. The method further includes capturing the native command set to a database. An advantage of at least one embodiment of the present invention is that statistics regarding the graphics requests from a given software application can be calculated. Another advantage of at least one embodiment of the present invention is that the performance of a given graphics card can be know before the card is built.

Figure 1:
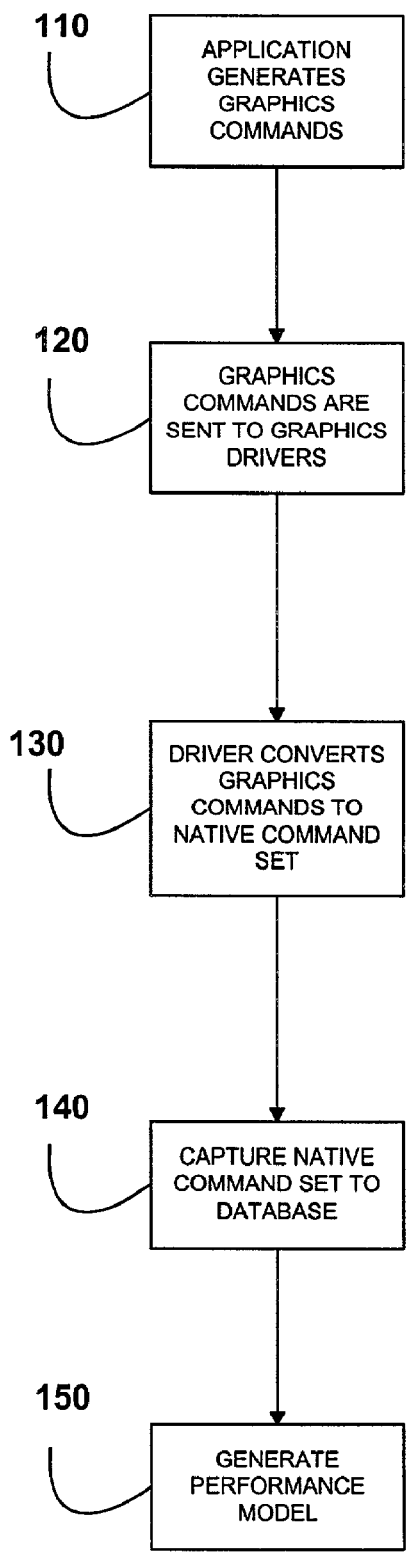
FIG. 1 is a flow chart illustrating a method for generating a performance model of a given application, according to one embodiment of the present invention.

Referring now to FIG. 1, a flow chart illustrating a method of capturing graphics commands and generating a statistical model related to an application is shown, according to at least one embodiment of the present invention. Graphics function calls are generated by a computer application. In step 110, a computer application generates requests related to video to be displayed. The requests may be related 3D (3-dimensional) graphics commands or 2D (2-dimensional) graphics commands. The requests generated by the computer application in step 110 are generally in the form of graphics function calls.

In step 120, the graphics function calls generated in step 110 are sent by the computer application to an application program interface (API), such as a software driver. An API provides a software interface by which an application program can access an operating system or other service, such as graphics processing hardware. The API can provide a translation from one format of calling conventions to another. In order to be properly processed by a graphics device, such as a graphics card, a graphics accelerator, or a graphics chip, the graphics function calls must be translated into a command set native to the graphics device. Accordingly, in step 130, the software driver converts the graphics function calls to a native command set.

In step 140, the native command set generated by the driver is captured to a database. In one embodiment, instructions are written into the driver to command the driver to send the native command set to an external database where the native command set is stored. Alternatively, the native command set can be read outside of the driver, such as from an I/O buffer, before being sent to system memory or the graphics device. The stored commands can be processed independently of the computer, driver, or graphics device. It will be appreciated that if the original graphics function calls generated by the computer application, in step 110, were stored, the driver would still be required to process the stored data to a native command set. Therefore, by storing the native command set after translation by the driver, the stored command set can be executed on a graphics system, independent of the driver or the information handling system in which the computer application is being executed. In one embodiment, the stored native command set spans multiple files in the database. In another embodiment, the database includes a single file for containing the native command set.

In step 150, the stored command set is analyzed, and statistics related to the computer application are generated. In one embodiment, the computer application generates requests related to 3D graphics. Commands related to 3D graphics include vertices for 3D objects as well as color related to the vertices. While executing the command set on different graphics hardware will lead to different results in how the commands are processed, general statistics related to the commands can be generated. In one embodiment, the statistics relate to the number of pixels per video frame that will need to be processed. The generated statistics can be used to generate a performance model of the application, which can then be compared to a description related to a graphics hardware to determine the combined performance of the computer application with the hardware, as will be discussed further in FIG. 3.

Figure 2:
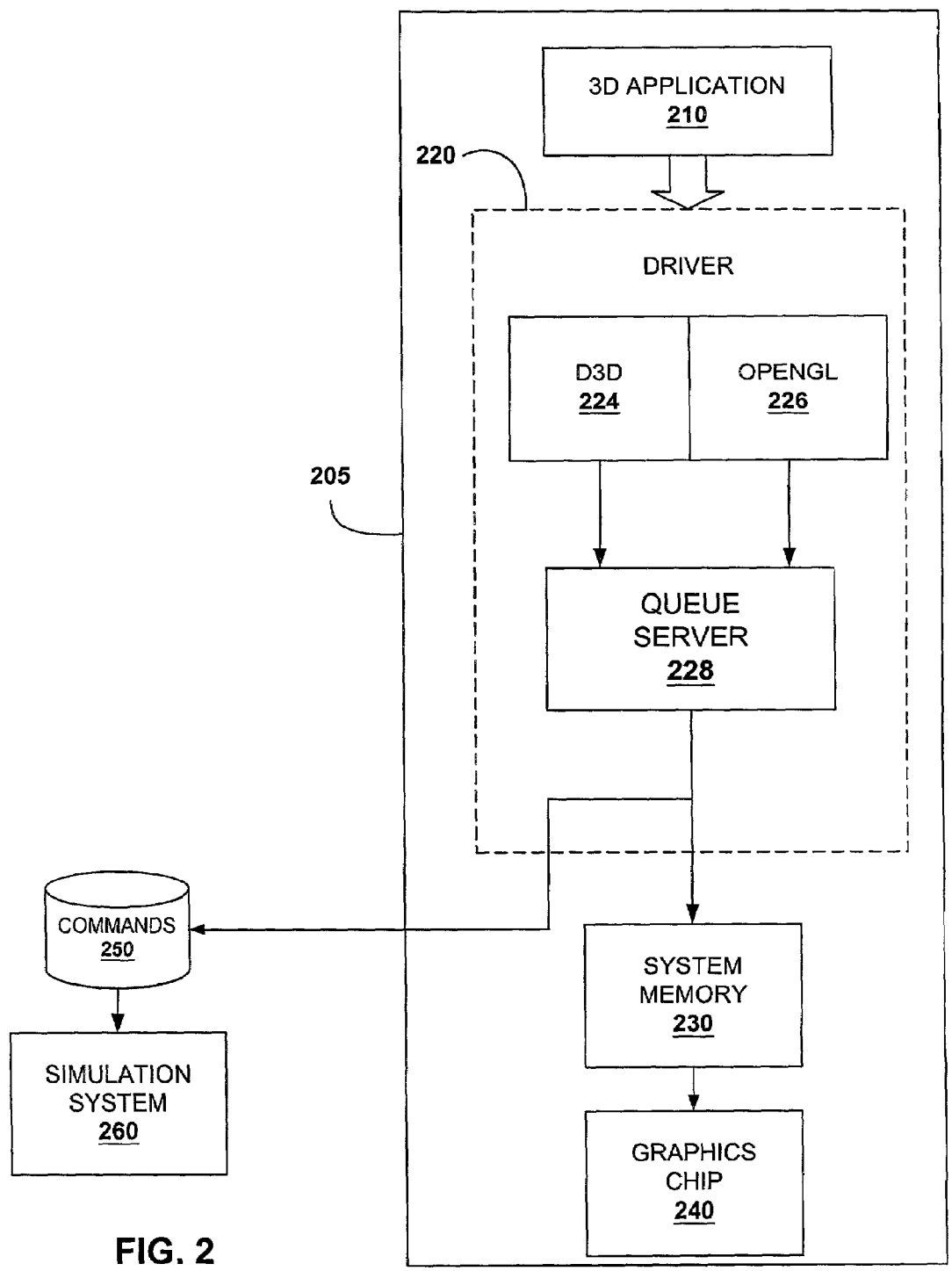
FIG. 2 is a block diagram illustrating a system for collecting graphics commands generated by a 3D graphics application, according to one embodiment of the present invention.

Referring now to FIG. 2, a block diagram illustrating a system for gathering and storing commands related to a 3D graphics application is shown, according to one embodiment of the present invention. A 3D application 210, executed as part of an information handling system 205, generates instructions to be processed by graphics hardware, such as graphics chip 240. As previously discussed, the graphics requests can be in the form of graphics function calls. The graphics function calls can be related to vertices of a 3D object to be rendered, and can include information on the color or translucence related to each of the vertices, or other appropriate information. The vertices can be combined by the graphics hardware to generate rendered objects.

An API, such as driver 220, receives the graphics function calls. The driver 220 translates the graphics function calls to a native command set, for execution on a graphics processing system, graphics card, or graphics chip 240. In one embodiment, two individual driver libraries, such as D3D 224 and OpenG1 226, are used to translate the graphics function calls generated by 3D application 210. D3D is part of a 3D graphics driver developed by Microsoft. OpenG1 is an open source graphics driver. Both D3D and OpenG1 can be used to provide translated native command set data to allow information handling system 205 and graphics chip 240 to process the graphics function calls. After the graphics function calls are translated, the native command set data is sent to queue server 228.

Queue server 228 is used to store the generated command set, before the command set is sent to system memory 230 for use by graphics chip 240. A routine of instructions can be integrated into driver 220 to allow the command set to be read from the queue server 228. The instructions allow individual commands to be stored in a separate database 250, while still allowing driver 220 to provide the command set to system memory 230 and graphics chip 240. In another embodiment, the commands can be captured as they are provided to system memory 230, outside of driver 220. The I/O buffer lines within information handling system 205, between driver 220 and system memory 230 can be monitored, allowing the native command set to be detected and captured. It will be appreciated that, in some cases, it would be more advantageous to capture the commands within driver 220, as previously discussed.

The entire command set related to 3D application 210, stored in queue server 228 is stored in database 250. The command set can include write commands, 2D commands, bitb1t commands, and 3D commands. BitB1t commands include algorithms for moving or copying rectangle of bits between a main memory and a display memory on a bit-mapped device, or areas within the memory used, such as system memory 230. 3D commands include 3D graphics routines, 3D data write commands, and 3D data draw commands, in which vertices related to 3D objects are provided. The draw commands can be indexed draw commands or non-indexed, or direct, draw commands. In one embodiment, the entire command set is stored as a single file in database 250.

The direct draw commands include vertex data. Index draw commands provide a pointer to the vertex data. The vertex data itself can be stored in a vertex buffer in system memory 230. Using pointers to the vertex data in the vertex buffer of system memory 230 is adequate for processing the command set in information handling system 205; however, access to system memory 230 or the vertex buffer may not be available. Therefore, the vertex data stored in system memory 230 must be provided in database 250. To store the vertex buffer data, the vertex data is included when an indexed draw command is stored.

In one embodiment of the present invention, a binary file in database 250 is produced when the routine to store the native command set is run in driver 220, through queue server 228. This binary file consists of a sequence of "Submit" packets. A Submit packet consists of a data word (DWORD) count followed by a series of command set packets. Typically the command set packets are taken from indirect buffers but they can also be constructed by other means. There are two types of Submit packets: a Header Submit packet; and an indirect buffer (IB) Submit packet. The binary file dumped to database 250 contains a Header Submit packet followed by a series of IB Submit packets.

One goal in defining this binary format is to make the playback of the dump as simple as possible when testing for functionality on simulation system 260. As much as possible, the format has been defined such that each Submit packet can be submitted "as is" to a graphics chip, such as graphics chip 240, and be processed by the graphics chip properly. However, some packets use Local Vertex Buffers (LVBs). In order for the dumps in database 250 to be played back correctly and for performance reasons, the vertex data in the LVBs must also be dumped. This is done by including a newly created draw command packet after every draw command packet that uses LVBS. The newly created draw command packet contains the vertex data for the preceding draw packet that uses LVBs.

A complication arises when capturing vertex data for newly created draw command packets. To access the Vertex Buffers containing the data, the capture program needs the linear addresses of the Vertex Buffers. However, only physical addresses are available from the regular command set stream sent to queue server 228. In one embodiment, the solution for obtaining the linear address from a physical address is to have the 3D drivers, D3D 224 and OpenG1 226 provide the associated linear address in Type 3 NOP packets in the command set stream.

A further complication arises in relocating data related to the frame buffer. The captured command set may include 32-bit absolute addresses for data related to the frame buffer in system memory 230 of an original system, such as information handling system 205. However, the frame buffer may not be available when the command set is executed during playback. Playback may be performed in a different system, such as simulation system 260, where the original frame buffer is not available. The frame buffer may also have changed or be de-allocated in the original system, information handling system 205, making reference to the original frame buffer unavailable. To accommodate playback, the frame buffer must be relocated to the same addresses as in the original system, such as information handling system 205, when the command set dump was captured. Accordingly, information must be included in the captured command set dump regarding the location of the frame buffer. The Header Submit packet contains information for allowing memory addresses in the captured command set in database 250 to be relocated. Table 1 shows the structure of a Header Submit Packet.

TABLE 1

Header Submit Packet

| Contents | Size | Description |
| --- | --- | --- |
| Header Count | 1 DWORD | Number of DWORDs contained in this Submit packet. |
| Type 3 NOP Packet | 7 DWORDs | A command set Type 3 NOP packet that contains two Type 0 packets. |

The Type 3 NOP packet contains two Type 0 packets. The two Type 0 packets contain the contents of the registers that give the location of the frame buffer, accelerated graphics port (AGP) space, and peripheral component interconnect (PCI) space in an address space internal to a graphics card or graphics chip 240. Table 2 illustrates the format of the Type 3 NOP packet.

TABLE 2

Type 3 NOP Packet

| Contents | Size | Description |
| --- | --- | --- |
| PM4 HEADER | 1 DWORD | Header for Type 3 NOP. |
| PM4 HEADER | 1 DWORD | Header for Type 0 packet. |
| MC_FB_LOCATION | 1 DWORD | Contents of frame buffer location register. |
| MC_AGP_LOCATION | 1 DWORD | Contents of AGP location register. |
| PM4 HEADER | 1 DWORD | Header for Type 0 packet. |
| AIC_LO_ADDR | 1 DWORD | Contents of PCI lower address register. |
| AIC_HI_ADDR | 1 DWORD | Contents of PCI higher address register. |

An IB Submit packet typically contains the contents of an indirect buffer that is being submitted via queue server 228. It is also possible for queue server 228 to create a sequence of command set packets internally to be dumped in such a Submit Packet. Table 3 shows the structure of an IB Submit packet.

TABLE 3

IB Submit Packet

| Contents | Size | Description |
| --- | --- | --- |
| COUNT | 1 DWORD | Number of DWORDs contained in rest of IB Submit packet: COUNT = Sum ( #DWORDs in each command set packet). |
| Type 2 Packet | 1 DWORD | See below for details. |
| PM4 Packet | variable length | Raw command set packet data. See below for details. |
| PM4 Packet | variable length | Raw command set packet data. See below for details. |
| . . . | . . . | . . . |
| PM4 Packet | variable length | Last command set packet in this Submit packet. |

For each indirect buffer that is captured, a Type 2 NOP packet is written after the COUNT and before the command set packets from the indirect buffer. This Type 2 NOP packet is used to indicate the address space in which the indirect buffer being captured is located. The address space is known by queue server 228 at the time the packets are captured.

Packets that index into LVBs require additional processing. For the purposes of this description, we call such packets "indexed primitives." In one embodiment of the present invention, the operation codes of indexed primitives include index draw commands, vector buffer data and 3D_RNDR_GEN_INDX_PRIM. The following describes how these are to be processed.

1. Set the RESERVED (low order byte) field of the indexed primitive's header to the original operation code.
2. Set the operation code field in the header of the indexed primitive to a NOP.
3. Write the NOPped indexed primitive to database 250 in binary.
4. Create a direct draw command packet that contains the equivalent vertex information as the original indexed primitive packet. The actual vertex information can be obtained from the LVBs.
5. Write the newly created direct draw command to disk in binary. Note that this newly created packet immediately follows the original (now NOPped) indexed primitive packet.

Table 4 shows the captured format of Type 3 packets that use LVBs. The physical address of Vertex Buffers can be extracted from vertex buffer pointer packets that are in the command set stream that is being captured to database 250. However, to access the vertex buffers, the capture program requires the linear address. Converting a physical address into its corresponding linear address is problematic because queue server 228 does not keep track of this address mapping nor does it know the linear address of the Vertex Buffers.

TABLE 4

Capture Packets for LVB Commands

| Contents | Size | Description |
| --- | --- | --- |
| <START OF INDEXED PRIMITIVE> | | |
| PM4 HEADER | 1 DWORD | Type 3 command set header of the indexed primitive. The operation code field should be set to a NOP and the RE-SERVED field should be set to the original operation command. |
| SE_VTX_FMT | 1 DWORD | Unchanged. |
| SE_VF_CNTL | 1 DWORD | Unchanged. |
| [indx 2 | indx 1] | 1 DWORD | Unchanged. |
| [indx 4 | indx 3] | 1 DWORD | Unchanged. |
| . . . | . . . | . . . |
| . . . | . . . | . . . |
| [indx n | indx n − 1] | 1 DWORD | Unchanged. |
| <START OF NEWLY CREATED DIRECT DRAW COMMANDS> | | |
| PM4 HEADER | 1 DWORD | Type 3 command set header of the new direct draw command packet. The COUNT field must reflect the contents of this packet. |
| SE_VTX_FMT | 1 DWORD | SE_VTX_FMT should be the same as the one in the original indexed primitive. |
| SE_VF_CNTL | 1 DWORD | SE_VF_CNTL.PRIM_WALK should be changed from 1 to 3 |

TABLE 4-continued

Capture Packets for LVB Commands

| Contents | Size | Description |
| --- | --- | --- |
| | | and the rest of the DWORD should remain the same as the original indexed primitive. |
| FTLVERTEX_1 | variable length | Vertex information extracted from LVB[[indx 1]]. |
| FTLVERTEX_2 | variable length | Vertex information extracted from LVB[[indx 2]]. |
| FTLVERTEX_3 | variable length | Vertex information extracted from LVB[[indx 3]]. |
| FTLVERTEX_4 | variable length | Vertex information extracted from LVB[[indx 4]]. |
| ... | ... | ... |
| FTLVERTEX_n − 1 | variable length | Vertex information extracted from LVB[[indx n − 1]]. |
| FTLVERTEX_n | variable length | Vertex information extracted from LVB[[indx n]]. |

Three possible solutions can be considered. In one embodiment the vertex buffers are stored in either AGP space or in the frame buffer. Since the linear addresses of the AGP base and the frame buffer are available to queue server 228 in the form of global variables, converting a vertex buffer's physical address into its linear address can be done by computing offsets. However, this solution only works if the vertex buffers are located in the frame buffer. It does not work if the vertex buffers are stored in AGP space because the linear address space of AGP is not contiguous. Specifically, vertex buffers are stored in the DirectDraw heap, which is allocated separately from the Ring Buffer space.

A second solution includes a function capable of converting a physical address into its linear address. However, this requires re-mapping the entire address space and may be difficult to implement, dependant on the information handling system or operating system being used. In a third solution, the drivers, D3D 224 and OpenGl 226, are used to provide the linear addresses in the command set stream by including a Type 3 NOP packet after every vector buffer pointer packet. According to one embodiment of the present invention, the contents of the Type 3 NOP packet are as shown in Table 5.

TABLE 5

Type 3 NOP Packet

| Ordinal | Field Name | Description |
| --- | --- | --- |
| 1 | [PM4 Header] | Command set header for Type 3 NOP packet. |
| 2 | VTX_AOS_ADDR0 | Virtual address of the first vertex buffer in the preceding vector buffer pointer packet. |
| 3 | VTX_AOS_ADDR1 | Virtual address of the second vertex buffer in the preceding vector buffer pointer packet. |
| ... | ... | ... |

The third solution is believed to have the highest chance for success and is the most expedient to implement. Since this solution changes the command set stream from the driver, for the sole purpose of facilitating the capture of command set packets, the Type 3 NOP packets are generated by only Debug versions of the 3D drivers, D3D 224 and OpenGl 226. The Production versions do not need to produce these extra packets to avoid adversely affecting performance. In addition, the first solution is also used in one embodiment as a fall-back mechanism in case the linear addresses are not available in the command set stream and the vertex buffer data are stored in the frame buffer. It should be noted that if the fall-back mechanism is used for vertex buffers stored in AGP space which is not contiguous, either dumping will terminate abnormally or the vertex data in the dump will be corrupt and playback will most likely terminate abnormally.

Accordingly, two modes of operation exist for executing the commands stored in database 250. In a first mode of operation, the vertex buffer data is not re-mapped in simulation system 260. The draw commands stored in database 250 are processed according to the direct draw commands, processing the packets created with the integrated vertex data. In a second mode of operation, the vertex data is re-mapped in simulation system 260. As commands are read from database 250, the vertex buffer is reconstructed within the system memory of simulation system 260. The vertex buffer can be re-mapped to the original addresses in which it was stored in system memory 230, using the same physical addresses as in information handling system 205. Alternatively, virtual addresses may be used and the vertex buffer may be mapped to other addresses within the memory of simulation system 260. Once the vertex buffer has been reconstructed in simulation system 260, a simulation can be performed using the stored commands. The stored commands are executed in simulation system 260, allowing statistical analysis to be performed on the stored data. A type-3 nop command refers to a nop command of an operation command, such as a nop with an indexed draw command. When type-3 nop commands are read from database 250, the nop instruction can be removed, allowing the original command to be processed using a pointer to the new vertex buffer. The direct draw commands generated in place of the indexed draw command are ignored. Once the simulation is complete, the vertex buffer data can be un-mapped and removed from simulation system 260. The data previously located in the memory of simulation system 260 can be re-mapped, allowing the system memory to be placed back as it was before the simulation was run.

As previously discussed, in one embodiment, the commands stored in database 250 are executed in a system separate from information handling system 205. Graphics chip 240 can be used to execute the commands of the native command set concurrently with the execution of the commands in the simulation system 260. Simulation system 260 and the original system may also be part of the same system. It will be appreciated that the system memory described herein may refer to the system memory of a host computer, such as system memory 230 in information handling system 205, as is used with video graphics cards that connect to an accelerated graphics port (AGP) integrated with the host computer system. Alternatively, the memory used may be integrated with the video graphics device used, such as a graphics card or graphics chip 240.

Figure 3:
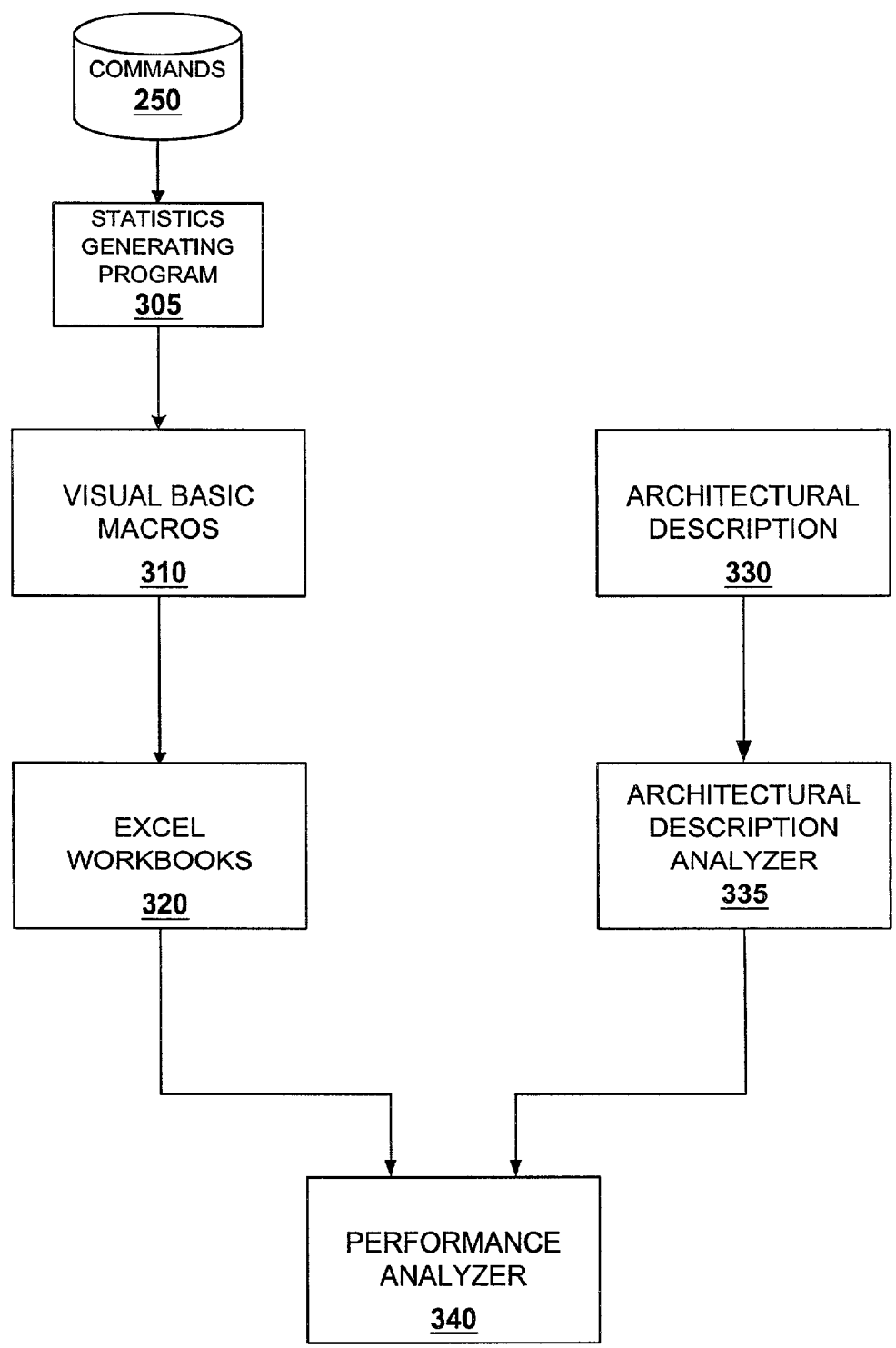
FIG. 3 is a block diagram illustrating a method of generating a performance model of a given graphics card, according to one embodiment of the present invention.

Referring now to FIG. 3, a method of determining hardware performance of a graphics application program is shown, according to one embodiment of the present invention. An application program generates a set of graphics function calls which are converted to a native command set by a driver in an information handling system, as previously discussed in FIG. 2. The driver translates the function calls to a native command set, allowing for portability. While the generated function calls may be specific to a driver or system, the translated command set can be run on other systems, without further need of the driver. Instructions inserted into the driver allow for the commands to be stored in a database 250. In one embodiment of the present invention, the native command set is processed through a program, such as statistics application 305.

Statistics application 305 is used to determine workload characteristics related to the native command set stored in database 250. The statistics relate to information about the type of processes requested by the application program. The workload characteristics include information on the number of pixels per frame to be processed, the number of triangles related to 3D models generated by the application program, and the percentage of bilinear or trilinear operations to be processed. Bilinear operations refer to interpolation algorithms performed for 3D graphics. Bilinear operations perform two interpolations whereas trilinear operations perform a third interpolation using the results from the bilinear operations. The percentage of alpha functions can also be determined. Alpha functions provide alpha blending wherein provided alpha values, representing the translucence related to an object vertex, are used to weight the intensities of various 3D objects against other objects. The amounts of other operations within the native command set can also be determined, such as the percentage of dithering, texture mapping, or filtering to be performed. The generated statistics are then delivered to Visual Basic Macros 310. In one embodiment, the generated statistics are delivered in the form of a text file. In one embodiment, statistics application 305 is a C program written to process the command set and provide generated statistics in the form of a text file.

Visual Basic macros 310 can provide additional processing on the statistics generated by statistics application 305. Visual Basic macros 310 provide the processed statistics as a set of Excel workbooks 320. Excel workbooks 320 can be used to combine the statistics to form an application model. The application model is a model used to describe the performance demanded by a specific application, such as the 3D application program 210 (FIG. 2). Excel workbooks 320 can also be used to provide displayable charts collecting the data generated by visual basic macros. The charts can be used to display the workload characteristics related to a specific application. It will be appreciated that Visual Basic macros 310 can also be used to display the workload characteristics.

To analyze the capability of a specific graphics device to handle the commands generated by the application program, an architectural description 330 can be used. The architectural description 330 can be generated using design specifications or marketing descriptions describing the proposed capabilities of the graphics device. Architectural description 330 can be analyzed with an architectural description analyzer 335. Architectural description analyzer 335 can provide a hardware model of the hardware device based on the data provided by architectural description 330.

By providing the hardware model generated by the architectural description analyzer 335 along with the application model generated by Excel workbooks 320 to a performance analyzer 340, a performance analysis can be generated. Performance analyzer 340 provides a performance analysis based on how well the hardware described by the architectural description 330 can handle the requests from the application program. The performance analysis includes a frame rate prediction, providing the maximum frame rate to be expected from the combination of hardware and application program. Using a more detailed architectural description can generate a more accurate prediction. The improved architectural description can be generated using software simulation, as discussed in FIG. 4, or hardware emulation, as discussed in FIGS. 5 and 6. In one embodiment of the present invention, architectural description analyzer 335 and performance analyzer 340 are components of an excel workbook. It will be appreciated that other programs for analyzing the software application and the architectural description may be used without departing from the scope of the present invention. For example, programs written under other languages, such as the C programming language, may be used to generate the software model.

Figure 4:
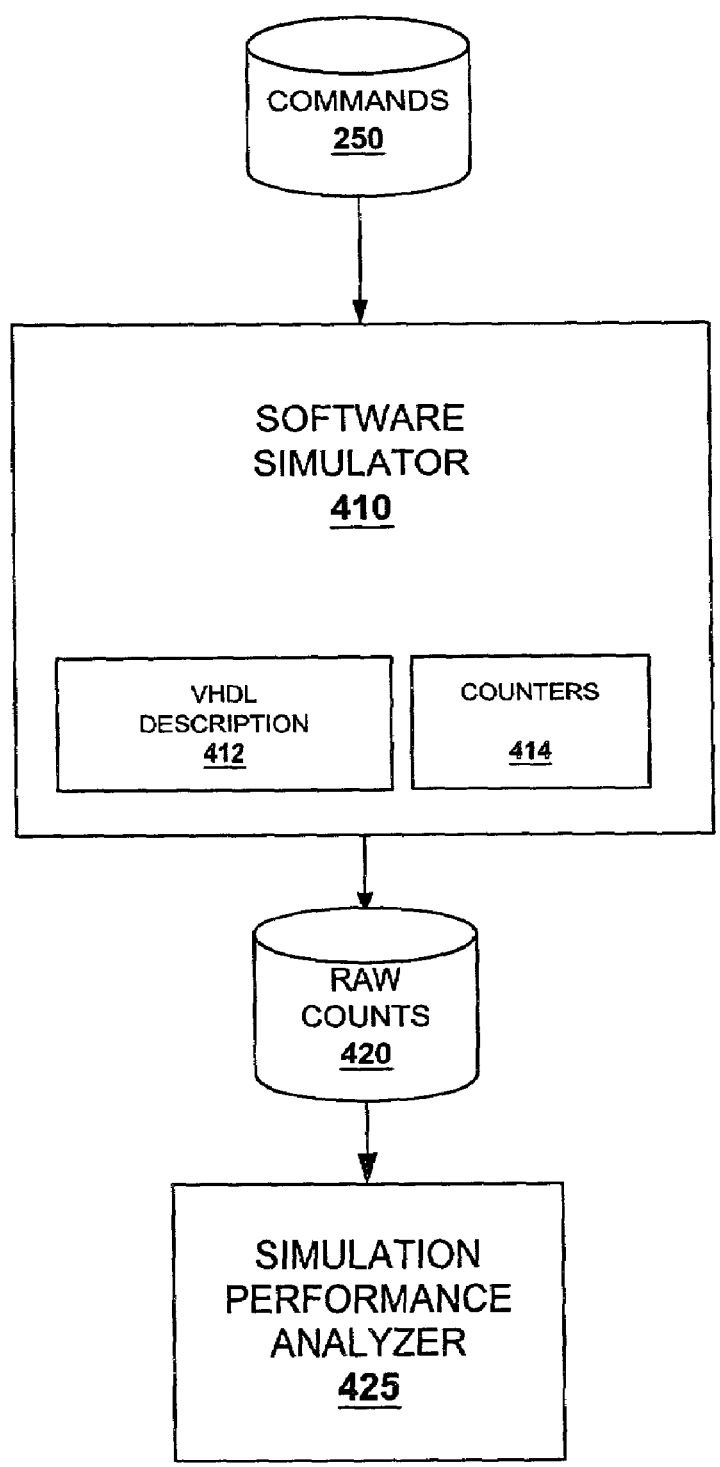
FIG. 4 is a block diagram illustrating a method of generating a performance model of a given graphics card using software simulation, according to one embodiment of the present invention.

Referring now to FIG. 4, a block diagram illustrating a method of determining hardware performance using software simulation is shown, according to one embodiment of the present invention. A native command set representing graphics function calls from an application program is stored in a database 250, as discussed in FIG. 2. The native command set in database 250 is sent to a set of visual basic macros 310 wherein workload characteristics based on the application program's requests can be generated, as discussed in FIG. 3. The generated statistics can be sent to a set of Excel workbooks 320, wherein a model of the application program can be generated, as discussed in FIG. 3.

A software simulator 410 can be used to simulate a hardware graphics device, such as a graphics card or a graphics chip. The software simulator 410 can simulate the hardware graphics device using a Very High Speed Integrated Circuit Hardware Descriptive Language (VHDL) script 412. The software simulator 410 can attempt to execute the native command set read from database 250. As previously discussed, software simulator 410 may be run on a system different from the original system running the application program. Software simulator 410 can also be run as part of the original system. In one embodiment, the execution of the native command set includes re-mapping vector buffer data in system memory relative to the simulating system. Alternatively, stored direct draw commands can be executed without requiring the vertex data to be mapped to a vertex buffer. The simulation can also be executed as software run on the original information handling system.

The number of clock cycles a graphics device, as defined by VHDL description 412, would take to process a command from the native command set are tracked and stored as counters 414. When a new command is received, counters 414 are reset to zero. Counters 414 track the number of cycles used in executing the command. The clock cycle count from counters 414 is stored in memory as the raw counts database 420 when the current command has been executed.

A simulation performance analyzer 425 reads the cycle counts from the raw counts database 420. Simulation performance analyzer 425 can be used to calculate statistics based on the native command set from database 250. Simulation performance analyzer 425 can also use the cycle counts read from raw counts database 420 to determine the performance of the graphics device being simulated. A performance analysis generated by simulation performance analyzer 425 can be used to determine performance characteristics in relation to using the graphics device to process the native command set, such as a frame rate prediction. It should be noted that the frame rate prediction assumes an infinitely fast software application. The cycle measurements taken and the native command set data do not consider idle times in which the graphics card may be waiting for the application program or a software driver to generate graphics requests. Therefore, the frame rate predicted is a best-case value, assuming the graphics card was capable of constantly receiving new commands to be processed by the graphics chip, or graphics card.

Alternatively, simulation performance analyzer 425 can be used to determine an improved architectural description, compared to an architectural description based solely on a marketing description, such as architectural description 330 (FIG. 3). An architectural description analyzer can then process the improved architectural description to provide a hardware model for performance analysis, as discussed in FIG. 3. In one embodiment of the present invention, simulation performance analyzer 425 is run by visual basic macros designed to process the information from raw counts database 420 and provide Excel workbooks for displaying the results.

Figure 5:
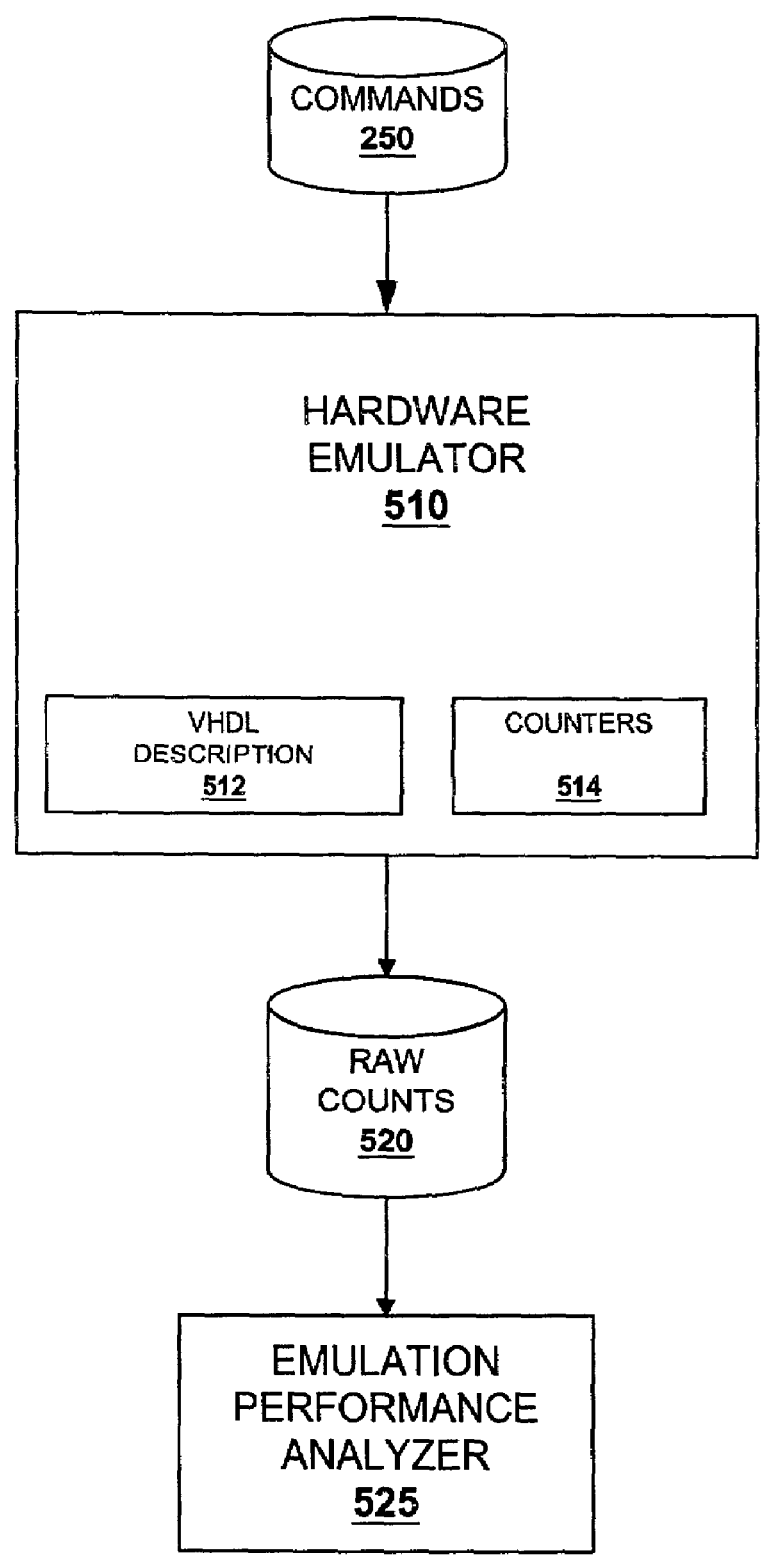
FIG. 5 is a block diagram illustrating a system for generating a performance model of a given graphics card using data gathered from a hardware emulation, according to at least one embodiment of the present invention.

Referring now to FIG. 5, a method of determining hardware performance using hardware emulation is shown, according to one embodiment of the present invention. As previously discussed, a native command set representing graphics function calls generated by an application program are stored in database 250. In one embodiment of the present invention, a hardware emulator 510 reads the native command set from database 250.

A VHDL script 512, describing a graphics device to be simulated can be provided using design specifications of the graphics device. Hardware emulator 510 processes the native command set using hardware components programmed to run according to VHDL description 512. It should be noted that while VHDL description 512 provides adequate information to execute the native command set, hardware emulator 510 might not process the commands as fast as the actual graphics device will. To allow accurate information to be gathered on the graphics device's performance, counters 514 are used to track clock cycles.

Counters 514 are used to track the number of clock cycles a graphics device, as defined by VHDL description 512, would take to process a command from the native command set. When a new command is received, counters 514 are reset to zero. Counters 514 track the number of cycles used in executing the command. The clock cycle count from counters 514 is stored in the raw counts database 520 when the command has been executed. In at least one embodiment, counters 514 are registers on hardware emulator 510 used to store the cycle count.

An emulation performance analyzer 525 reads the cycle counts from the raw counts database 520. Emulation performance analyzer 525 can be used to calculate statistics based on the native command set from database 250. Emulation Performance analyzer 525 can also use the cycle counts read from raw counts database 520 to generate a performance analysis. The performance analysis can be used to determine performance characteristics in relation to using the graphics device to process the native command set, such as a frame rate prediction. As previously discussed, the frame rate prediction assumes an infinitely fast software application. Accordingly, the frame rate predicted is a best-case value, assuming the graphics card was constantly being given new commands to be processed by the application program.

Alternatively, emulation performance analyzer 525 can be used to generate an improved architectural description. As previously discussed in FIG. 4, the improved architectural description can be used to update the architectural description used in simulations, such as in FIG. 3. In one embodiment of the present invention, emulation performance analyzer 525 is run by visual basic macros designed to process the information from raw counts database 520.

Figure 6:
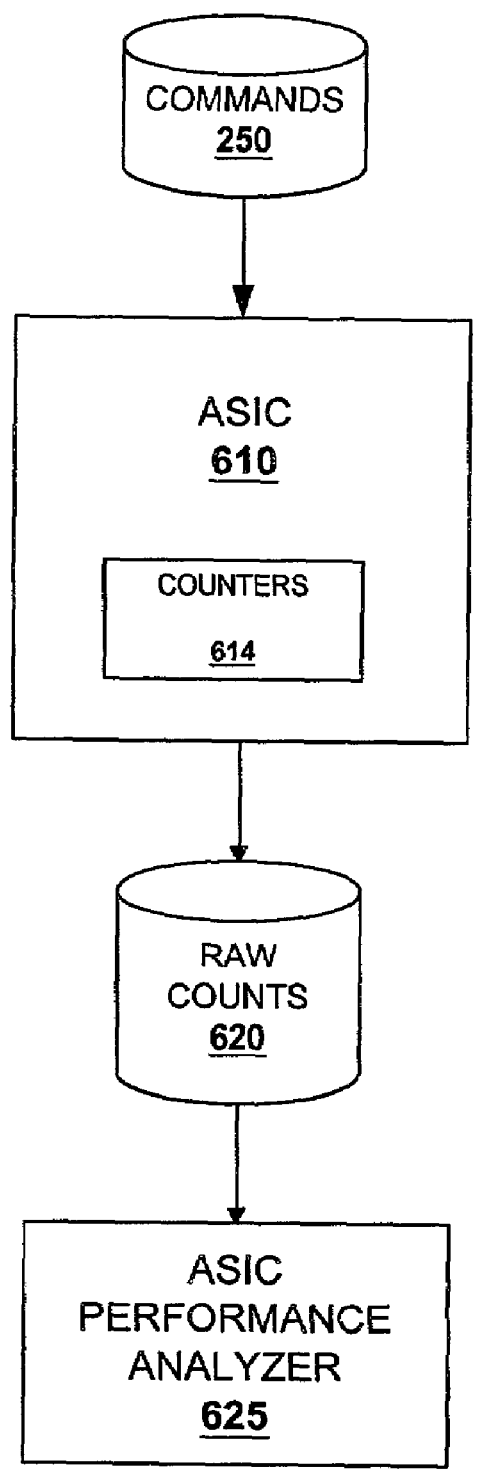
FIG. 6 is a block diagram illustrating a system for generating a performance model of a given graphics card using data gathered using an application specific integrated circuit (ASIC), according to one embodiment of the present invention.

Referring now to FIG. 6, a method of determining a hardware performance using an application specific integrated circuit (ASIC) is shown, according to one embodiment of the present invention. The ASIC 610 is used to execute the command set stored in database 250. ASIC 610 is used to supplement or test the results generated using hardware emulation, as described in FIG. 5.

ASIC 610 is an integrated circuit using detailed design information based on the hardware to be tested. ASIC 610 executes the commands in database 250. As previously discussed, counters 614 are used to track and store the number of cycles taken for each command to be processed. Once the command has completed execution, the cycle count from counters 614 is read and stored in raw counts database 620. The raw counts are then delivered to an ASIC performance analyzer 625. ASIC performance analyzer 625 can process and analyze the counts from raw counts database 620 to generate a performance analysis. As previously discussed, the performance analysis includes an analysis of the capabilities of ASIC 610 to handle the commands stored in database 250, such as frame rate prediction.

In one embodiment of the present invention, ASIC performance analyzer 625 is equivalent to emulation performance analyzer 525, used to provide analysis of the hardware emulator 510 described in FIG. 5. The performance analysis generated by ASIC performance analyzer 625 can be compared to the performance analysis generated by emulation performance analyzer 525. The comparison can be used to determine if hardware emulator 510 was capable of adequately emulating the hardware being tested. Accordingly, hardware emulator 510 or VHDL description 512 can be altered to better represent the hardware being tested by matching the results generated by emulation performance analyzer 525 to the results generated by ASIC performance analyzer 625. In one embodiment, ASIC performance analyzer 625 includes Visual Basic macros, outputting results into Excel workbooks. It should be appreciated that ASIC performance analyzer 625 can include other programs without departing from the scope of the present invention.

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   receiving a graphics function call at a driver;
   converting, at the driver, the graphics function call to a native command set for execution on a native system; and
   capturing the native command set in a database for subsequent performance analysis.

2. The method as in claim 1, wherein the database includes a single file.

3. The method as in claim 1, wherein the graphics function call is a draw command.

4. The method as in claim 3, wherein when the draw command is an indexed draw command, capturing the native command set includes storing the indexed draw command and storing a direct draw command associated with the indexed draw command.

5. The method as in claim 4, wherein, for each captured indexed draw command, a first mode of operation executes a direct draw command related to the indexed draw command directly and a second mode of operation stores data associated with the direct draw command in buffer locations and then executes the indexed draw command.

6. The method as in claim 4, wherein stored indexed draw commands are made inoperative using a no-op command.

7. The method as in claim 6, wherein the no-op command is a type-3 no-op command.

8. The method as in claim 6, wherein, for each captured indexed draw command, a first mode of operation executes a direct draw command related to the indexed draw command directly and a second mode of operation stores data associated with the direct draw command in buffer locations and then executes the indexed draw command.

9. The method as in claim 4, wherein storing indexed draw commands includes storing vertex data associated with the indexed draw command.

10. The method as in claim 9, further including:
configuring the driver to provide a virtual address indicating a location of the vertices of the indexed draw command when the indexed draw command uses a physical location of the vertices.

11. The method as in claim 1, further including:
issuing the native command set to a first system, capable of executing the native command set, simultaneous with the capturing of the native command set.

12. The method as in claim 11, further including:
providing commands in the database to a second system for execution subsequent to the capturing of the native command set.

13. The method as in claim 12, wherein the first system and the second system are the same system.

14. The method as in claim 13, wherein the first system and the second system include at least one of: a graphics chip; a hardware emulator; a software simulator; or an architectural description analyzer.

15. The method as in claim 12, wherein the first system and the second system are different systems.

16. The method as in claim 1, further including:
re-mapping a system to match indexed physical values, wherein the system is used for simulating a native system related to the native command set.

17. The method as in claim 16, further including:
simulating the native system by executing one or more commands from the native command set.

18. The method as in claim 17, further including:
tracking the number of clock cycles in executing the one or more commands.

19. The method as in claim 17, further including:
un-mapping the system when the simulation is complete.

20. The method as in claim 1, further including:
receiving architectural description; and
determining an estimated performance based on the architectural description and workload characteristics of the native command set.

21. The method as in claim 20, wherein the workload characteristics relate to 3D graphics performance, as defined with the native command set.

22. The method as in claim 20, wherein the workload characteristics relate to 2D graphics performance, as defined with the native command set.

23. The method as in claim 20, wherein the workload characteristics relate to memory usage, as defined with the native command set.

24. A system comprising:
a data processor having an I/O buffer; and
a memory having an I/O buffer coupled to the I/O buffer of the data processor, the memory capable of storing code for:
an application capable of generating graphics function calls;
a driver capable of capturing the graphics function calls and converting the graphics function calls to a native command set; and
a routine capable of capturing the native command set to a database for subsequent performance analysis.

25. The system as in claim 24, wherein the database includes a single file for collecting the native command set.

26. The system as in claim 24, wherein the driver includes a queue server, wherein a queue server is capable of receiving multiple commands of the native command set and outputting the commands.

27. The system as in claim 24, wherein the graphics function call is a draw command.

28. The system as in claim 27, wherein, for each indexed draw command, the routine is further capable of storing the indexed draw command and storing a direct draw command associated with the indexed draw command.

29. The system as in claim 28, wherein, for each stored indexed draw command, a first mode of operation executes the direct draw command associated with the indexed draw command directly and a second mode of operation stores data associated with direct draw command in buffer locations and then executes the indexed draw command.

30. The system as in claim 28, wherein stored indexed draw commands are made inoperative using a no-op command.

31. The system as in claim 30, wherein the no-op command is a type-3 no-op command.

32. The system as in claim 30, wherein, for each stored indexed draw command, a first mode of operation executes the direct draw command associated with the indexed draw command directly and a second mode of operation stores data associated with direct draw command in buffer locations and then executes the indexed draw command.

33. The system as in claim 28, wherein storing indexed draw commands includes storing vertex data associated with the indexed draw commands.

34. The system as in claim 33, wherein the driver is configured to provide a virtual address indicating a location of the vertices of the indexed draw command when the indexed draw command uses a physical location of the vertices.

35. The system as in claim 24, further including:
a first system capable of executing the native command set simultaneous with the capturing of the native command set.

36. The system as in claim 35, further including:
a second system capable of executing the native command set captured in the database.

37. The system as in claim 36, wherein the first system and the second system are the same system.

38. The system as in claim 37, wherein the first system and the second system include at least one of: a graphics chip; a hardware emulator; a software simulator; or an architectural description analyzer.

39. The system as in claim 36, wherein the first system and the second system are different systems.

40. The system as in claim 36, wherein the second system is re-mapped to match indexed physical values, and wherein the second system is used for simulating a native system related to the native command set.

41. The system as in claim 40, wherein the second system is further capable of simulating the native system by executing one or more commands of the native command set.

42. The system as in claim 41, wherein the second system includes counters capable of tracking the number of clock cycles used in executing the one or more commands.

43. The system as in claim 41, wherein the second system is un-mapped when the simulation is complete.

44. The system as in claim 24, further including:
an architectural description; and
a performance analyzer capable of determining an estimated performance based on the architectural description and workload characteristics.

45. The system as in claim 44, wherein the workload characteristics relate to 3D graphics performance, as defined with the native command set.

46. The system as in claim 44, wherein the workload characteristics relate to 2D graphics performance, as defined with the native command set.

47. The system as in claim 44, wherein the workload characteristics relate to memory usage, as defined with the native command set.

48. A method of determining graphics processing performance, the method comprising:
receiving a graphics function call at a driver;
converting, at the driver, the graphics function call to a native command set for execution on a native system;
capturing the native command set in a database; and
executing the command set to determine graphics processing performance.

49. The method as in claim 48, wherein the database includes a single file.

50. The method as in claim 48, wherein executing includes hardware emulation.

51. The method as in claim 48, wherein executing includes software simulation.

52. The method as in claim 48, wherein the driver includes a queue server, wherein the queue server is capable of receiving multiple commands of the native command set and outputting the commands.

53. The method as in claim 48, wherein the graphics function call is a draw command.

54. The method as in claim 53, wherein, for each indexed draw command, capturing the native command set includes storing the indexed draw command and storing a direct draw command associated with the indexed draw command.

55. The method as in claim 54, wherein, for each stored indexed draw command, a first mode of operation executes the direct draw command associated with the indexed draw command directly and a second mode of operation stores data associated with direct draw command in buffer locations and then executes the indexed draw command.

56. The method as in claim 54, wherein stored indexed draw commands are made inoperative using a no-op command.

57. The method as in claim 56, wherein the no-op command is a type-3 no-op command.

58. The method as in claim 56, wherein, for each stored indexed draw command, a first mode of operation executes the direct draw command associated with the indexed draw command directly and a second mode of operation stores data associated with direct draw command in buffer locations and then executes the indexed draw command.

59. The method as in claim 54, wherein storing indexed draw commands includes storing vertex data associated with the indexed draw commands.

60. The method as in claim 59, further including:
configuring the driver to provide a virtual address and to request a physical address indicating a location of the vertices of the indexed draw command when the indexed draw command uses a physical location of the vertices.

61. The method as in claim 48, further including:
issuing the native command set to a first system, capable of executing the native command set, simultaneous with the capturing of the native command set.

62. The method as in claim 61, further including:
providing commands in the single file to a second system for execution subsequent the capturing of the native command set.

63. The method as in claim 62, wherein the first system and the second system are the same system.

64. The method as in claim 63, wherein the first system and the second system include at least one of; a graphics chip; a hardware emulator; a software simulator; or an architectural description analyzer.

65. The method as in claim 62, wherein the first system and the second system are different systems.

66. The method as in claim 48, further including:
re-mapping a system to match indexed physical values, wherein the system is used for simulating a native system related to the native command set.

67. The method as in claim 66, further including:
simulating the native system by executing one or more commands of the native command set.

68. The method as in claim 67, further including:
tracking the number of clock cycles in executing the one or more commands.

69. The method as in claim 67, further including:
un-mapping the system when the simulation is complete.

70. The method as in claim 48, further including:
receiving architectural description; and
determining an estimated performance based on the architectural description and workload characteristics of the native command set.

71. The method as in claim 70, wherein the workload characteristics relate to 3D graphics performance, as defined with the native command set.

72. The method as in claim 70, wherein the workload characteristics relate to 2D graphics performance, as defined with the native command set.

73. The method as in claim 70, wherein the workload characteristics relate to memory usage, as defined with the native command set.

* * * * *